United States Patent [19]

Cavalli

[11] 4,305,900
[45] Dec. 15, 1981

[54] METHOD AND APPARATUS FOR COVERING A MULTIPLE WIRE CONDUCTOR WITH A CROSS-LINKABLE OR VULCANIZABLE INSULATION

[75] Inventor: Mario Cavalli, Milan, Italy

[73] Assignee: Industrie Pirelli Societa per Azioni, Milan, Italy

[21] Appl. No.: 183,721

[22] Filed: Sep. 3, 1980

[30] Foreign Application Priority Data

Sep. 14, 1979 [IT] Italy ................................ 25700 A/79

[51] Int. Cl.³ ................................................ B29F 3/10
[52] U.S. Cl. .................................... 264/174; 156/461; 156/500; 264/236; 264/285; 425/113; 425/114; 425/380; 425/466; 425/467
[58] Field of Search ..................... 264/174.3, 103, 236, 264/285; 425/113, 114, 380, 466, 467; 156/244.13, 500, 461

[56] References Cited

U.S. PATENT DOCUMENTS

| | | | |
|---|---|---|---|
| 2,213,481 | 9/1940 | Alder et al. | 425/113 |
| 2,366,528 | 1/1945 | Heath | 425/113 |
| 2,642,898 | 6/1953 | Acock et al. | 156/244.13 |
| 2,989,430 | 6/1961 | Pulaski | 156/500 |
| 3,087,007 | 4/1963 | Jachimowicz | 264/174 |
| 3,172,931 | 3/1965 | Peterson | 425/113 |
| 3,238,280 | 3/1966 | Gray et al. | 264/103 |
| 3,239,885 | 3/1966 | Niesse | 264/174 |
| 3,332,138 | 7/1967 | Garner | 264/173 |
| 3,692,448 | 9/1972 | Menasoff | 425/113 |
| 3,856,446 | 12/1974 | Schultz | 425/113 |
| 3,869,235 | 3/1975 | Moore | 425/113 |
| 3,944,459 | 3/1976 | Skobel | 425/113 |

Primary Examiner—Jeffery R. Thurlow
Attorney, Agent, or Firm—Brooks, Haidt, Haffner & Delahunty

[57] ABSTRACT

A method for continously covering by extrusion, with a cross-linkable or vulcanizable material, a wire conductor around which a separating tape is longitudinally folded with overlapped lips. In the method, upstream of the extrusion step, a force of such a magnitude and orientation as to permit a controlled relative displacement of the overlapped lips, not greater than a predetermined value, is applied to the separating tape. The extrusion head used in the method of the invention comprises, in the feed cavity for the taped conductor in advance of the male mold, a tubular element having an inner diameter close to that of the taped conductor but not mechanically secured in position within said cavity.

12 Claims, 4 Drawing Figures

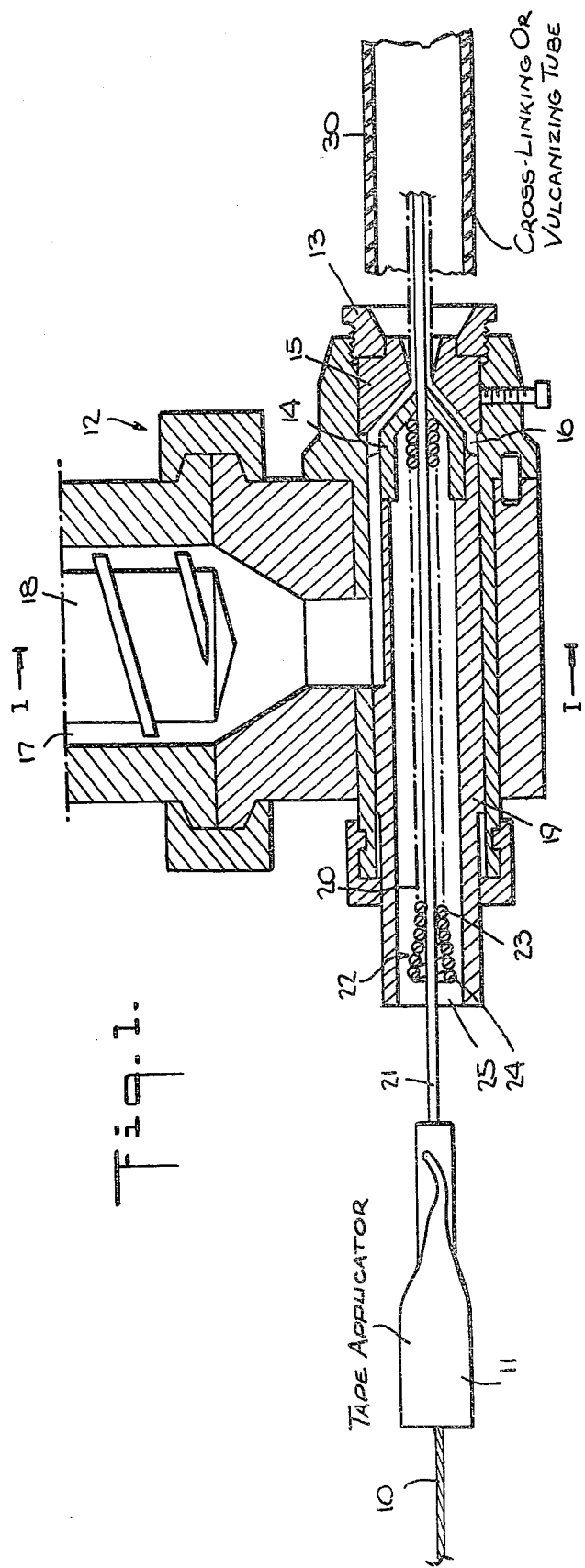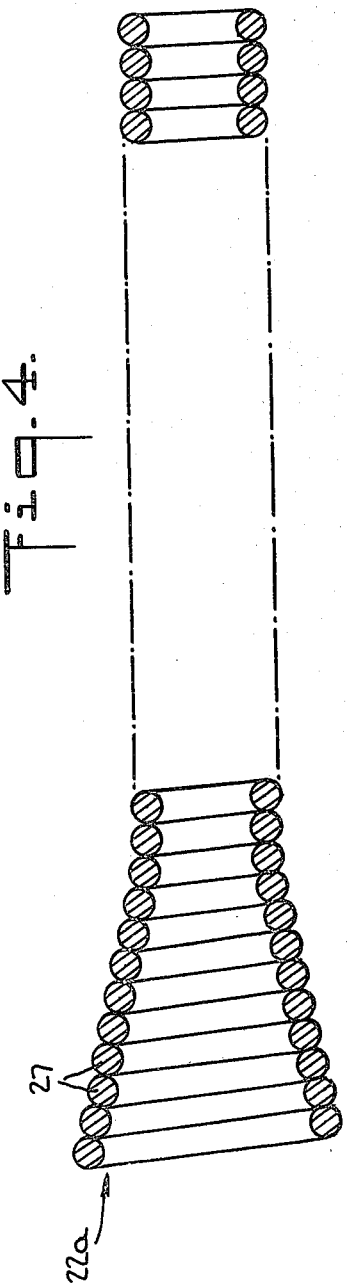

METHOD AND APPARATUS FOR COVERING A MULTIPLE WIRE CONDUCTOR WITH A CROSS-LINKABLE OR VULCANIZABLE INSULATION

The present invention relates to an improved method, especially, but not exclusively, suitable for covering a conductor with an extruded insulating material, which is cross-linkable or vulcanizable, in a continuous cross-linking or vulcanizing line. Such conductor comprises a plurality of wires stranded together and is especially adapted for use at low and medium voltages (up to 35 kV).

This invention relates to an improved extrusion head which permits carrying out of the method according to the present invention.

In the present state of the art, the preferred dielectrics used for cross-linked or vulcanizable, extruded insulation for insulating conductors of electric cables, are, generally, materials constituted by polyolefin or by olefin copolymers, such as, for example, polyethylene, or ethylenepropylene rubber.

It is known that in an electric cable, the insulation is applied on the conductor as a coaxial layer having a thickness suitable to the rated voltage of the cable. In a cable intended for use at low voltages, a layer of insulating material is extruded directly on the conductor. If the cable is intended for use at medium voltages, the insulating layer is generally preceded by a thin layer of a semi-conductive material having the function of an inner electrostatic screen and is followed by another thin layer, also of a semi-conductive material, which constitutes the outer electrostatic screen.

For the layers constituting the screens, when these are present, and, generally, according to the more advanced techniques, resort is also made to the extrusion of suitable semi-conductive materials which are also vulcanizable in a continuous vulcanizing line.

The inner semi-conductive layer can be extruded successively to the insulation, or contemporaneously with the insulation and with the outer semi-conductive screen. In the first case, the inner layer is extruded by an extrusion head arranged upstream of and in series with the extrusion head for the insulation and eventually, also contemporaneously, with the extrusion head of the outer semi-conductive layer. In the second case, the insulating layer and the inner and outer semi-conductive layers are applied in only one passage of the conductor through a single, triple flow extrusion head.

Both a conductor of the type intended for use at low voltages, after having been covered with the insulating layer, and a conductor of the type intended for use at medium voltages, after having been covered with at least the insulating layer, pass from the extrusion head, directly to the cross-linking or vulcanization step which takes place in a tube connected in a tight manner to the outlet opening of the extrusion head. Such tube, called cross-linking or vulcanizing tube, comprises a first or heating part, immediately downstream of the outlet opening of the extrusion head and, in series with the first part, a second or cooling part.

It is necessary that the cross-linking or vulcanizing process take place under pressure to assure the compactness of the cross-linked or vulcanized material and to avoid the formation in the same of bubbles and cavities that could arise if the cable, after the extrusion step, should be exposed to the room ambient. For the same reason, after the heating, in consequence of which the vulcanizing or cross-linking process takes place, it is necessary to cool the insulated cable under pressure.

Most plants used up to now employ saturated steam for heating the insulated conductor, in the first part of the cross-linking or vulcanizing tube, and water for cooling said insulated conductor in the second part, always, as said, under pressure. Said pressure ranges, in general between 18 and 20 atmospheres. Consequently, when the conductor, having the stranded together wires covered with insulation by the extrusion head, passes from the head into the vulcanizing tube, connected in a tight manner to said extrusion head, the insulation, still uncured and dough-like, tends to penetrate into the interstices between the wires and tears.

The tears in the insulation permit the steam to penetrate between the wires, spreading rapidly in a longitudinal sense among these latter and producing oxidation. The moisture which penetrates between the wires can not be easily eliminated.

It was believed that when the inner semi-conductive screen is applied upstream with respect to application of the insulation and of the outer semi-conductive screen, the drawbacks due to the penetration of the extruded material among the interstices of the wires were avoided by reason of the fact that the thin semi-conductive layer reached the extrusion head for the insulation already consolidated enough to prevent such tears. However, in practice, it has been found that, also in this case, the formation of cavities inside the insulation, in consequence of the penetration of this latter between the wires, is not negligible.

Attempts have been made to obviate the drawback of the tearings and the cavities caused by said tearings, by compacting the stranded conductors. The compactness was obtained by making said stranded conductors pass through calenders or threading dies. Theoretically, although making conductors obtained by means of individual elements (wires) which give flexibility to the cable, it should be desirable to avoid all the voids between the wires, but in practice, this is not possible.

In any event, some voids remain even if the wires of the stranded conductors are as close as possible, and the risk of cracks and leaks in the insulation, as well as that of penetration of steam and water, persists.

Other systems try to prevent the penetration of the insulation into the interstices between the wires by previously lapping the conductor to be sent to the extrusion head, with at least a tape known as "separating tape." The lapping can be spiral-like, but, preferably, is made with tapes folded longitudinally on the conductor and with overlapped edge portions and lips.

For the low voltage cables, it is preferred to use tapes of polyester resin which, having a low sensitivity to heat, offer a certain safety margin as regards the stability to the temperatures which are met during the production of the insulated conductor. For medium voltage cables, generally, it is preferred to use tapes based on polyamide resins made semi-conductive in a known way per se.

These tapes have however also a low tendency to bending yield. Consequently, after having been applied on the conductor, the longitudinally folded tapes tend to assume their original position, i.e. to move their edges away from each other, during passage through the production line and downstream of the tape applicator, when passing through a short run in the air to reach the extrusion head and through a further run in the transfer cavity of the extrusion head, before reaching the male mold, immediately upstream of which, the taped conductor is covered with the extruded material, either insulating material or material which forms only the inner semi-conductive material.

The male mold tends to cause the longitudinal lips of the tape to approach each other to a certain degree and for a value which can be defined as pre-determined. If, however, the lips reach the mold with a divergence greater than the amount of displacement of the lips which could be counterbalanced by the approaching action of said mold, the lips get deformed and can permit the extruded material to penetrate between them, downstream of the mold, causing that leaking phenomenon of the insulation which it is desired to avoid. Also, it can happen that, near the male mold, the deformed lips of the tape can produce tearing of the extruded material.

The whole phenomenon leads to great wastes of work and to loss of time in addition to a great uncertainty about the quality of the product.

The present invention has, as one object, the avoidance of said drawbacks, preventing the tape lips from separating further on, within the extrusion head, where the advancing taped conductor, after the application of the tape and before reaching the mold, passes through a free run, hidden from, and out of the control of, the operator.

The invention also has the object of eliminating the slight displacement of the lips which could already arise during the short run in air of the taped conductor, from the tape applicator output to the input of the extrusion head.

Moreover, the invention proposes an improved method for covering insulated conductor with a material which is cross-linkable or vulcanizable by a continuous cross-linking or vulcanizing line, as well as an improved extrusion head able to accomplish said method.

More precisely the invention relates to an improved method for covering with a material which is cross-linkable or vulcanizable in a continuous cross-linking or vulcanizing line, at least a conductor, consisting of a plurality of wires stranded together, said conductor being covered with at least a separating tape, folded longitudinally and having overlapped lips. Said method comprises at least an extrusion step or a step of extruding on said taped conductor, said material cross-linkable or vulcanizable in a continuous vulcanizing line, and is characterized by the fact of comprising a further step for applying on said separating tape of the taped conductor and in advance of said extrusion step, at least a force of such a magnitude and orientation as to permit a controlled relative displacement being not greater than a pre-determined value.

The invention relates, moreover, to an improved extrusion head for carrying out said method, said head having at least an extrusion screw, a conveying system for the extruded material, a transfer cavity in which the taped conductor is advanced, said cavity being terminated, at its outlet opening, by at least a male mold aligned with a female mold.

Said extrusion head is characterized by the fact that a tubular element of an inner diameter close to that of said taped conductor, is releasably received, and extends longitudinally of, said cavity, said tubular element having no mechanical fixed connection to the cavity walls and being freely supported by the taped conductor during its advance through said cavity.

Other objects and advantages of the present invention will be apparent from the following detailed description of the presently preferred embodiments thereof, which description should be considered in conjunction with the accompanying drawings in which:

FIG. 1 is a diagrammatic, side elevation view, partly in cross-section, of an extrusion head contained in a line for covering a wire conductor with an extruded insulation in accordance with the invention;

FIG. 4 illustrates, in longitudinal cross-section, a tubular, tape engaging element comprising adjacent rings.

Figure 2:
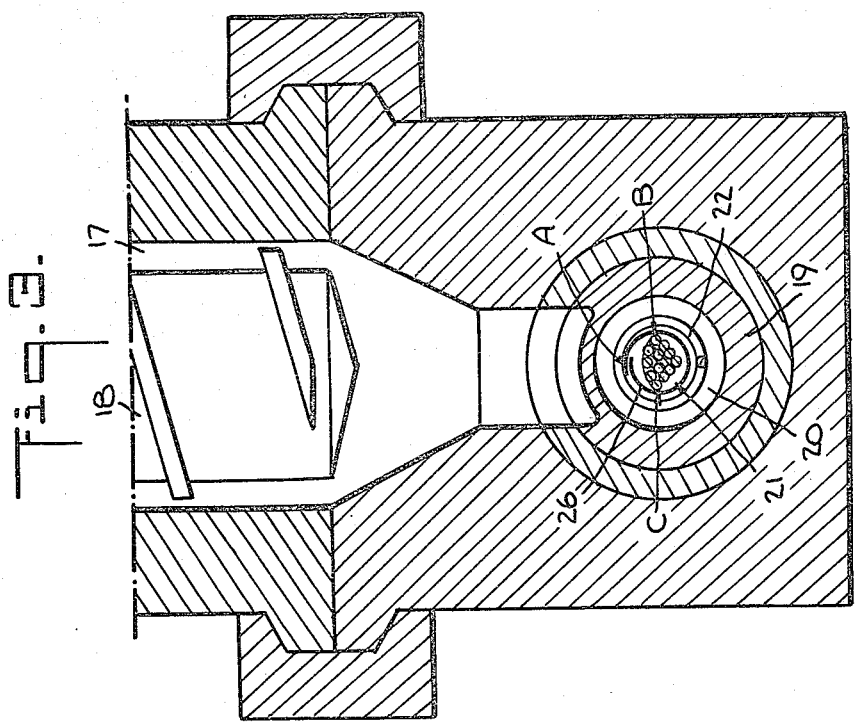
FIG. 2 is a transverse cross-section, taken along the line I—I in FIG. 1, of the extrusion head shown in FIG. 1 as it appears when covering a wire conductor having a transverse cross-section of a circular shape.

FIG. 1 illustrates, only partially, a line for covering an electric conductor 10 with an insulating material which is cross-linkable or vulcanizable in a continuous cross-linking or vulcanizing tube 30. Said cross-linkable or vulcanizable material may be called an "uncured" insulating material. Said conductor 10 is constituted by stranded together wires. The conductor 10 is lapped with at least a separating tape 26 (see FIGS. 2 and 3).

Only those elements necessary for the understanding of the invention have been shown. FIG. 1 shows the applicator 11 of the separating tape 26 and, downstream of it, the extrusion head 12. Neither the conventional feeder of the conductor 10, nor the conventional feeder of the tape 26 have been shown. The cross-linking or vulcanizing tube 30, which must be applied in a tight manner to the extrusion opening 13 of the head 12, has been illustrated only diagrammatically.

The applicator 11 may be of any conventional type suitable for folding longitudinally and with overlapped longitudinal lips, the separating tape 26 on the wire conductor 10. The separating tape 26 is preferably of a polyester resin, for example, polyethyleneglycolterephthalate for low voltage cables or a polyamide resin for medium voltage cables.

The extrusion head 12 comprises at least a male mold 14 and a female mold 15 aligned and spaced with respect to each other on the same axis. The hollow space 16 between the two molds constitutes the final duct for the extruded material coming from the chamber 17 which contains the extrusion screw 18.

The male mold 14 is supported by a carrier tube 19, the longitudinal cavity 20 of which, sealed at its outlet by the male mold 14, constitutes a transfer cavity for advancing the taped conductor 21. A tubular element 22 having a diameter greater, but, preferably, near that of the taped conductor 21 is received within said transfer cavity 20 without being mechanically secured in place. The element 22 is, in effect, a floating element supported only by the taped conductor 21 and held against longitudinal movement by the male mold 14.

In the preferred embodiment shown by way of example in FIG. 1, the tubular element 22 is also flexible. In fact, it is constituted by a cylindrical helix having convolutions 23 near, or contacting, each other. The opening of the cylindrical helix is frusto-conical with its greater base 24 facing the inlet 25 of the transfer cavity 20. The cylindrical helix is, preferably, made of metallic material, for example, stainless steel.

The conductor 10 having stranded together wires and coming from a decoiler (not shown), passes through the applicator 11 which longitudinally folds a separating tape 26 around the conductor 10, the folded tape 26 having circumferentially overlapping edge portions of lips. The separating tape 26 arrives from a corresponding decoiler (not shown). A taped conductor 21 enters the tubular element 22.

In preliminaries to the operation of the line, the tubular element 22 is removed from the transfer cavity 20. The separating tape 26 is secured on the forward head of the taped conductor 21, projecting from the applicator 11, for example, by winding an adhesive tape around said separating tape 26. The forward head of the taped conductor 21, so prepared, is inserted into the tubular element 22 until part of the head of the conductor 21 projects from the front end of the element 22.

At this point, the tubular element 22, with the taped conductor 21 therein, is again placed inside the transfer cavity 20, and the projecting part of the taped conductor 21 is pushed through the male mold 14 and female mold 15. The conductor 21 part projecting from the female mold 15 is hooked to a conventional drawing element, for example, a drawing rope, which will guide said cable part to the outlet of the cross-linking or vulcanizing tube 30. Said drawing rope, after having been passed at least through a drawing element, is at last wound on a suitable coil. (The rope, the drawing element and the coil are not shown in the drawings.)

Then, when the line is set in motion, in a way well known to the technician in the field, and the extruder is not working, the taped conductor 21, advancing at uniform speed along the transfer cavity 20, is co-axial with the male mold 14 and female mold 15. The tubular element 22 is consequently freely supported by the taped conductor 21.

In this way, the tubular element 22 controls the relative displacement of the overlapped logitudinal lips of the separating tape 26 which, owing to the low tendency of the material constituting the tape to remain bent, tends to separate.

Let it be supposed that the tubular element 22, constituted as illustrated in FIG. 1 by a cylindrical helix having the convolutions contacting each other, has such an inner diameter that the convolutions get in contact with the separating tape 26 of the taped conductor 21 along a single generatrix, as in FIG. 2 where the taped conductor 21 has a circular cross-section. Then, a force uniformly distributed along said generatrix is applied to the separating tape 26 of the taped conductor 21 passing through the transfer cavity 20, and therefore the force is applied upstream of the extrusion position at which the conductor 21 passes beyond the male mold 14. Said force is oriented according to gravity and will impede the relative displacement of the longitudinal lips of the separating tape 26 so that it does not exceed a pre-determined value.

The pre-determined value of the maximum relative displacement of the longitudinal lips generally depends on the ability of the opening of the male mold 14 used in the extrusion head to bring the lips together, and said ability is a function of said opening dimension with respect to the overall dimension of the taped conductor 21.

Figure 3:
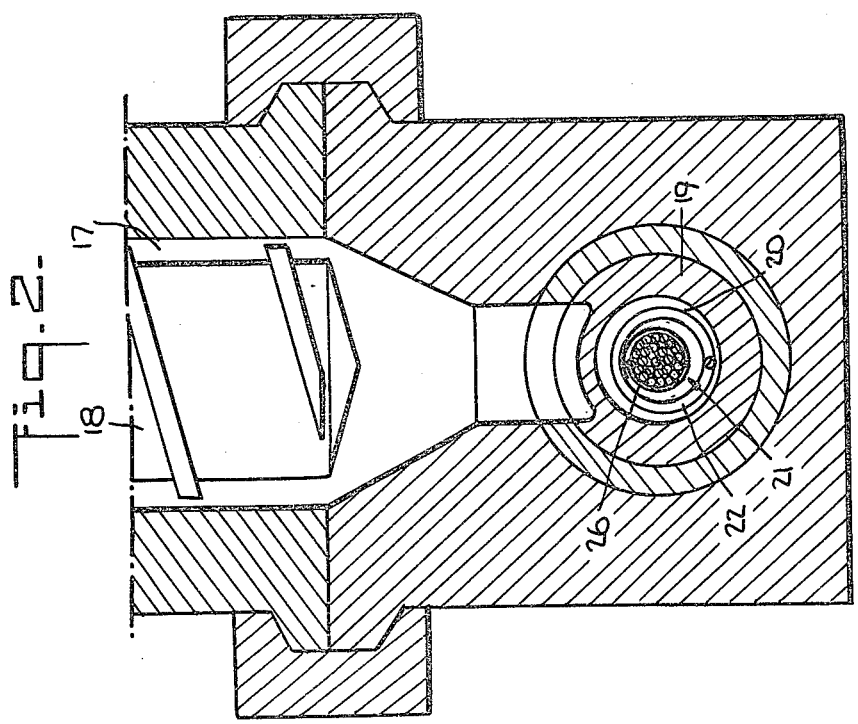
FIG. 3 is similar to FIG. 2 but shows the covering of a wire conductor having a transverse cross-section of a sector shape.

During the covering of a taped conductor of a sector cross-sectional shape, the tubular element 22 could have an inner diameter sufficiently near the outer one of the taped conductor 21, so that the contact of the tubular element 22 with the separating tape 26 could happen along three generatrices (see FIG. 3—points A, B, C, of intersection). In this case the force, controlling the displacement of the longitudinal lips of the separating tape 26, would be distributed uniformly along said three generatrices with such a magnitude and orientation as to permit a controlled displacement by the longitudinally overlapped lips of the separating tape 26.

By using a different flexible tubular element, for example, one having a cylindrical helix but with convolutions not contacting each other, the force for controlling the relative displacement of the longitudinal lips of the separating tape 26, would be applied only in a discrete number of points on one or on a plurality of generatrices along said separating tape 26 of the taped conductor 21 as it advances through the transfer cavity 20.

Also, during the run in the air from the applicator 11 to the input 25 of the transfer cavity 20, the longitudinal lips of the separating tape 26 of the taped conductor 21 tend to separate. The relative displacement is always very limited, owing to the short run and moreover the length is under a continuous control by the operator who can intervene at the right time, if a displacement, greater than safe limits, should occur.

In any event, the tubular element 22 illustrated by way of example in FIG. 1, is intended, with its frustoconical opening, to eliminate gradually that slight displacement of the longitudinal lips which could arise during the run in the air downstream of the applicator 11.

Although the tubular element 22, which improves the action of the extrusion head according to the invention, is shown as a cylindrical helix having its convolutions adjacent to one another, it can also be contracted in a different manner. Among the possible constructions of the tubular element 22 is one formed by a cylindrical helix with spaced convolutions. Another embodiment of the tubular element 22 is one which consists of a set of small cylinders or rings 27 as illustrated in FIG. 4. Each intermediate ring 27 is adjacent to a base of the previous or of the subsequent ring with its corresponding base.

However, it is not always necessary that the tubular element 22 be flexible. It could also be constituted by a single rigid cylinder made of a suitable material. In the case of an embodiment consisting of rings, or of a single rigid cylinder, the tubular element could be made with a longitudinal slit along the whole generatrix, the configuration of its transverse cross-section being approximately a circle.

If desired, the method and apparatus of the invention may be used to apply an uncured semi-conductive material to the taped conductor 21.

Although preferred embodiments of the present invention have been described and illustrated, it will be apparent to those skilled in the art that various modifications may be made without departing from the principles of the invention.

I claim:

1. In a method in which a conductor-separating tape combination comprising an electrical conductor having a plurality of wires which are covered with a longitudinally folded separating tape having circumferentially overlapped edge portions is covered with uncured insulating material by continuously advancing the combination through a transfer cavity of an extrusion head and by extruding the uncured insulating material over the combination as it leaves the downstream end of the transfer cavity, said edge portions tending to separate due to the resiliency of the tape material and said transfer cavity having an internal size greater than the exterior size of the combination so that the wall of the cavity is out of engagement with the folded tape, the further step of limiting the displacement of the overlapped edge portions of the folded tape with respect to each other to a pre-determined value during the travel of the combination through the transfer cavity in advance of the extrusion of the uncured insulating material by applying forces to the folded tape on the conductor as the combination travels through the transfer cavity, such forces being directed toward the tape and being of a magnitude sufficient to permit relative displacement of said edge portions of the tape which is not greater than said pre-determined value, said forces being applied by force applying means within the transfer cavity intermediate the wall of the cavity and the tape and being supported by the taped conductor and in contact with the tape but being unsecured to the wall of the transfer cavity so that the force applying means is free to move as a unit within the transfer cavity in the direction transversely of the direction of movement of said conductor through said transfer cavity.

2. Method as set forth in claim 1 wherein said forces are applied to said tape at a plurality of points along the length thereof.

3. Method as set forth in claim 2 wherein said forces are applied to said tape along a helical line, the axis of the helix being the same as the longitudinal axis of the conductor.

4. Method as set forth in claim 2 wherein said forces are applied to said tape along a plurality of lines extending parallel to the longitudinal axis of the conductor.

5. Method as set forth in claim 2, 3 or 4 wherein the forces are uniform in the length direction of the conductor.

6. In an extrusion head for extruding an uncured material over a conductor comprising a plurality of wires and having a separating tape longitudinally folded therearound with circumferentially overlapping edge portions, said head having a male mold with an opening through which the conductor with the tape thereon passes, said male mold being aligned with and separated from a female mold having an opening, said head having means for supplying said material to the space between the male mold and the female mold and having a transfer cavity in advance of the male mold through which the conductor with the tape thereon passes to the male mold, the combination therewith of a tubular element within and extending longitudinally of said cavity for limiting the displacement of the overlapping edge portions of the tape with respect to each other, said element having an inner size greater than the diameter of the conductor with the tape thereon which is passed through the opening in the male mold and an outer size less than the cross-sectional size of said cavity and said element being unsecured to said head whereby it is freely supported by the conductor with the tape thereon when the conductor with the tape thereon passes through the head and is free to move with the conductor and the tape in a direction transverse to the direction of movement of the conductor with the tape thereon.

7. An extrusion head as set forth in claim 6 wherein the inner size of said element is substantially equal to the size of said opening in said male mold.

8. An extrusion head as set forth in claim 6 or 7 wherein said tubular element is flexible.

9. An extrusion head as set forth in claim 6 or 7 wherein said tubular element is a metal helix.

10. An extrusion head as set forth in claim 9 wherein the turns of the helix abut one another.

11. An extrusion head as set forth in claim 6 or 7 wherein one end of the tubular element is adjacent the male mold and the opposite end of the element has an inner size greater than the inner size of the remainder thereof, the inner size of the element decreasing uniformly from the greater size at said opposite end to the inner size of the remainder thereof.

12. An extrusion head as set forth in claim 6 or 7 wherein said tubular element is a plurality of axially aligned rings in abutting relation.

* * * * *